United States Patent Office 3,576,805
Patented Apr. 27, 1971

3,576,805
N²,N⁴,N⁶-TRISUBSTITUTED MELAMINES
Margot Louise Cantrall, New City, Martin Leon Sassiver, Monsey, and Robert Gordon Shepherd, South Nyack, N.Y., assignors to American Cyanamid Company, Stamford, Conn.
No Drawing. Filed May 22, 1969, Ser. No. 827,032
Int. Cl. C07d 55/22
U.S. Cl. 260—249.6         9 Claims

ABSTRACT OF THE DISCLOSURE

This disclosure describes compounds of the class of 2-polymethyleneimino - 4,6 - bis(tertiary - alkylamino) - s-triazines and 2-(tertiary-alkylamino)-4,6-bis(polymethyleneimino)-s-triazines useful as anti-mycobacterial agents.

BRIEF SUMMARY OF THE INVENTION

This invention relates to new derivatives of melamine and, more particularly, is concerned with novel compounds which may be represented by the following general formulae:

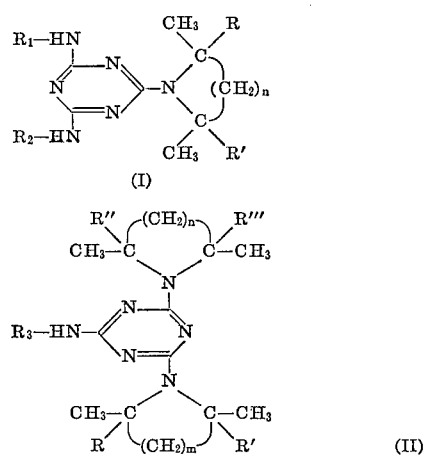

wherein R, R', R" and R''' are each hydrogen or methyl; $R_1$, $R_2$ and $R_3$ are each tertiary alkyl of from 4 to 11 carbon atoms; and $n$ and $m$ are each 2, 3 or 4. Suitable tertiary alkyl groups of from 4 to 11 carbon atoms contemplated by the present invention are, for example, tert-butyl, tert-amyl, 2-methyl-2-hexyl, 2-methyl-2-heptyl, 2-methyl-2-octyl, 2,3-dimethyl - 2 - butyl, 2,3,3-trimethyl-2-butyl, 2,3-dimethyl-2-pentyl, 2,4-dimethyl-2-pentyl, 2,3,3-trimethyl-2-pentyl, 2,4,4-trimethyl-2-pentyl, 3-methyl-3-pentyl, 3-ethyl-3-pentyl, 2,3-dimethyl-2-hexyl, 2,4-dimethyl-2-hexyl, 2,5-dimethyl-2-hexyl, 3-methyl-3-hexyl, 3-ethyl-3-hexyl, 3,4-dimethyl-3-hexyl, 3,5-dimethyl-3-hexyl, 3-methyl-3-heptyl, 4-methyl-4-heptyl, etc.

Typical compounds of the present invention include, for example, 2-(2,5-dimethyl-1-pyrrolidino)-4-(3-methyl-3-hexylamino)-6-(tert-amylamino)-s - triazine, 2-(2,6-dimethyl-1-piperidino)-4,6-bis(tert butylamino)-s-triazine, 2-(2,7-dimethyl - 1 - hexamethyleneimino)-4-(3-methyl-3-heptylamino)-6-(2-methyl - 2 - heptylamino)-s-triazine, 2-(2,3,3-trimethyl-2-butylamino) - 4 - 6-bis(2,5-dimethyl-1-pyrrolidino)-s-triazine, 2-(2,5-dimethyl-2-hexylamino)-4,6-bis(2,6-dimethyl - 1 - piperidino)-s-triazine, 2-(3,5-dimethyl-3-hexylamino) - 4,6 - bis(2,7-dimethyl-1-hexamethyleneimino)-s-triazine, 2-(2,2,5 - trimethyl-1-pyrrolidino)-4,6-bis(2-methyl - 2 - hexylamino)-s-triazine, 2-(2,2,6,6-tetramethyl - 1 - piperidino)-4-(4-methyl-4-heptylamino)-6-(2,3-dimethyl-2-butylamino) - s - triazine, 2-(3-ethyl-3-pentylamino) - 4,6 - bis(2,2,5,5-tetramethyl-1-pyrrolidino) - s - triazine, 2-(2,3,3-trimethyl - 2 - pentyl- amino)-4,6-bis(2,2,7,7-tetramethyl - 1 - hexamethyleneimino)-s-triazine, 2-(3 - methyl-3-pentylamino)-4-(2,2,6-trimethyl - 1 - piperidino)-6-(2,2,7-trimethyl-1-hexamethyleneimino)-s-triazine, and the like.

DETAILED DESCRIPTION OF THE INVENTION

The 2,4,6 - tris(substituted - amino) - s - triazines of the present invention are colorless, crystalline or glass-like solids at room temperature and are relatively insoluble in water but soluble in many organic solvents such as ethanol, acetone, dimethylformamide, and the like.

The 2,4,6 - tris(substituted-amino) - s - triazines of the present invention form non-toxic acid-addition salts with a variety of organic and inorganic salt-forming reagents. Thus, acid-addition salts, formed by admixture of the melamine base with an acid, suitably in a neutral solvent, are formed with such acids as sulfuric, phosphoric, hydrochloric, hydrobromic, trichloroacetic, trifluoroacetic and related acids. For purposes of this invention, the N²,N⁴,N⁶-trisubstituted melamines are equivalent to their non-toxic acid-addition salts.

The novel N²,N⁴,N⁶-trisubstituted melamines of the present invention may be readily prepared from cyanuric chloride (III) as illustrated in the following reaction scheme:

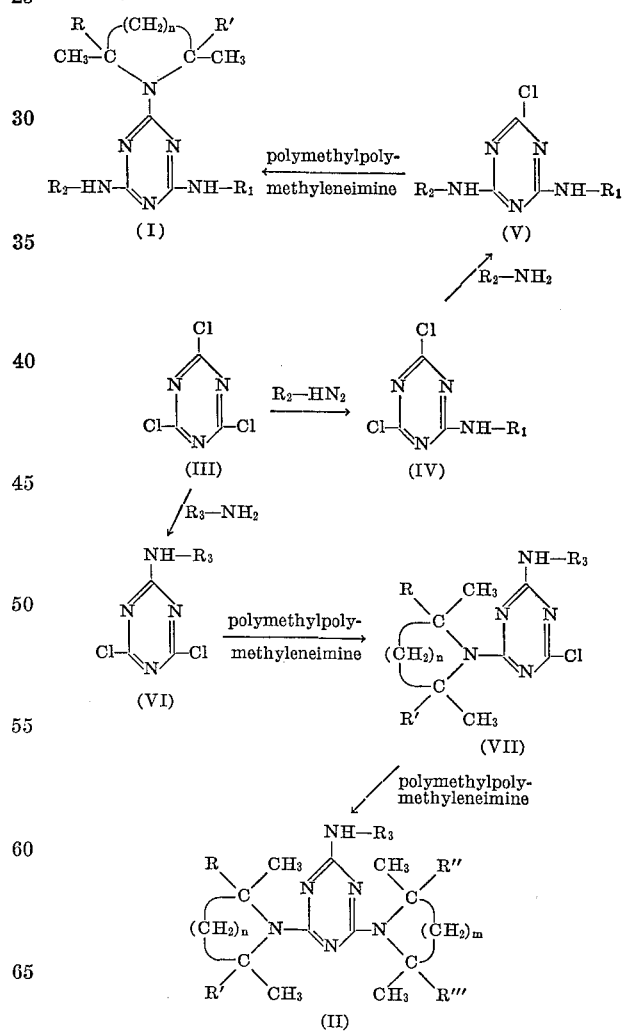

wherein R, R', R", R''', $R_1$, $R_2$, $R_3$, $n$ and $m$ are as hereinabove defined. When $R_1$ and $R_2$ are different, the substitution of the tert-alkylamino groups at the 2- and 4-positions is carried out stepwise as indicated in the above reaction scheme employing equimolar amounts of tert-alkylamine and cyanuric chloride (III) or 2-(tert-alkylamino)-4,6-dichloro-s-triazine (IV) in the first two steps and an excess of polymethylpolymethyleneimine and 2,4-bis(tert-alkylamino)-6-chloro-s-triazine (V) in the final step. When $R_1$ and $R_2$ are the same, then two molecular equivalents of a tert-alkylamine are reacted with cyanuric chloride (III) followed by treatment of the intermediate 2,4-bis(tert-alkylamino)-6-chloro-s-triazine (V) with an excess of polymethylpolymethylimine. In this manner, the 2 - polymethylpolymethyleneimino - 4,6 - bis(tert-alkylamino)-s-triazines (I) are readily obtained. Likewise, the treatment of cyanuric chloride (III) with an equimolar amount of a tert-alkylamine followed by treatment of the intermediate 2-(tert-alkylamino) - 4,6 - dichloro-s-triazine (VI) with an excess of polymethylpolymethyleneimine provides the 2-(tert-alkylamino)-4,6-bis(polymethylpolymethyleneimino)-s-triazines (II) wherein the polymethylpolymethyleneimino moieties are the same. When the polymethylpolymethyleneimino moieties are different, the substitution at the 4- and 6-positions is carried out stepwise as indicated in the above reaction scheme employing an equimolar amount of a polymethylpolymethyleneimine and 2-(tert-alkylamino)-4,6-dichloro-s-triazine (VI) in the first step and an excess of another polymethylpolymethyleneimine and 2 - (tert-alkylamino) - 4 - (polymethylpolymethyleneimino)-6-chloro-s-triazine (VII) in the last step. Also, the steps may be reversed so that, for instance, a polymethylpolymethyleneimino group is introduced first.

The above reactions may be carried out in an inert solvent such as toluene or xylene for a period of time from about 3 hours to 24 hours or more at temperatures ranging from about 25° C. to about 200° C. Alpha-pyridone may be employed as a catalyst in the above reactions or used as a reaction solvent. Variation in the reaction time and temperature is dependent upon the structure of the amine reagent; less sterically hindered amines reacting most readily whereas sterically hindered amines react with more difficulty. When one or two molecular equivalents of amine are used, then an acid scavenger such as sodium bicarbonate, soda ash, or a tertiary amine such as diisopropylethylamine should be employed to take up the hydrochloric acid produced in the reaction. In those cases where an excess of amine may be used, then an acid scavenger and/or an inert solvent may be dispensed with.

The 2,4,6-tris(substituted-amino)-s-triazines of the present invention are active against *Mycobacterium tuberculosis* H37Rv infections in mice when tested in accordance with the following procedure. Carworth Farms CF1 white mice, females, 4 to 6 weeks old, weighing 17 to 22 grams, are infected with *Mycobacterium tuberculosis* H37Rv by administration intravenously of 0.2 ml. of a buffered saline suspension containing approximately 1.5 mg. per ml. wet weight of a 12 to 14 day culture of the test organism grown on Sauton's agar medium. Routinely, 200–300 mice are given this standard infection and then segregated in a random manner into cages each of which holds five or ten mice. Four groups of five mice each are retained as untreated controls, and the remaining mice are used to ascertain activity of compounds under test. During a one year experience with this test, the standard infection defined above caused a 99.5% mortality, in that 756 of the 760 infected untreated control mice died within 28 days, the normal period of the test.

A measured amount of each compound to be tested is administered orally incorporated in a Standard Diet to groups of infected mice for 14 days, after which the mice are fed untreated Standard Diet. Control animals receive untreated Standard Diet for the entire test period and all animals are allowed to feed at will. Tests are terminated 28 days after the day of infection. A compound is judged active if it either saves 2 or more of the 5 mice in a test group in two tests or prolongs average survival time by 4 or more days compared to untreated controls.

The Standard Diet used in this test procedure is a commercial feed designed for laboratory mice and rats composed of the following ingredients: Animal liver meal, fish meal, dried whey, corn and wheat flakes, ground yellow corn, ground oat groats, dehulled soybean meal, wheat germ meal, wheat middlings, cane molasses, dehydrated alfalfa meal, soybean oil, brewers' dried yeast, irradiated dried yeast (source of vitamin $D_2$), riboflavin, niacin, calcium pantothenate, chlorine chloride, vitamin A palmitate, D-activated animal sterol, α-tocopherol, dicalcium phosphate, thiamine hydrochloride, menadione sodium bisulfite (source of Vitamin K activity), salt and traces of: manganous oxide, copper sulfate, iron carbonate, potassium iodate, cobalt sulfate, and zinc oxide. The said commercial feed has the guaranteed analysis as containing a minimum of 24.0% crude protein, a minimum of 4.0% crude fat and a maximum of 4.5% crude fiber and is sold under the trademark Wayne Lab-Blox® by Allied Mills, Inc., Chicago, Illinois. In the test procedure described hereinabove, the Standard Diet into which measured amounts of the test compounds had been homogeneously incorporated was administered to infected test animals, whereas untreated Standard Diet was given to infected control animals.

In a representative operation, and merely by way of illustration, the following compounds of the present invention are active in this test procedure at the indicated oral dose as set forth in Table I below:

TABLE I

| Compound | Percent compound in diet | Alive/total mice tested 28 days after infection |
|---|---|---|
| 2-(2,5-dimethyl-1-pyrrolidino)-4,6-bis(2,4,4-trimethyl-2-pentylamino)-s-triazine | 0.4 | 5/5 |
| | 0.1 | 5/5 |
| | 0.025 | 4/5 |
| | 0.006 | 1/5 |
| 2-(2,6-dimethyl-1-piperidino)-4,6-bis(2,4,4-trimethyl-2-pentylamino)-s-triazine | 0.4 | 5/5 |
| | 0.1 | 5/5 |
| | 0.025 | 2/5 |
| | 0.006 | 2/5 |
| 2-(2,4,4-trimethyl-2-pentylamino)-4,6-bis(2,5-dimethyl-1-pyrrolidino)-s-triazine | 0.4 | 5/5 |
| | 0.1 | 4/5 |
| | 0.025 | 3/5 |

NOTE: Infected, non-treated controls: 100/100 mice died with an average survival time of 19 days.

The following examples illustrate the preparation of typical compounds of the present invention.

EXAMPLE 1

Preparation of 2-(2,5-dimethyl-1-pyrrolidino)-4,6-bis(2,4,4-trimethyl-2-pentylamino)-s-triazine A mixture of 7.4 g. (0.02 mole) of 2,4-bis(2,4,4-trimethyl-2-pentylamino)-6-chloro-s-triazine, 4.15 g. (0.042 mole) of 2,5-dimethylpyrrolidine and 150 ml. of xylene is heated at reflux for 16 hours. At the end of this period the xylene is washed with 50 ml. of water, dried, and evaporated to a gum. Trituration of the gum with water, and then with methanol yields a white powder, weight 6.6 g., M.P. 89–91° C. Recrystallization from methanol yields 4.9 g. of purified product, M.P. 92–94° C.

EXAMPLE 2

Preparation of 2-(2,6-dimethyl-1-piperidino)-4,6-bis(2,4,4-trimethyl-2-pentylamino)-s-triazine A mixture of 7.4 g. (0.02 mole) of 2,4-bis(2,4,4-trimethyl-2-pentylamino)-6-chloro-s-triazine, 9.5 g. (0.084 mole) of 2,6-dimethylpiperidine and 30 ml. of xylene is placed in a Parr bomb and heated at 200° C. for 24 hours. The mixture was cooled and an additional 5 g. of 2,6-dimethylpiperidine and 20 ml. of xylene are added and the mixture is reheated at 180° C. for another 24 hours. At the end of this period additional xylene is added and the combined xylene solutions are washed with water and dried. The xylene is evaporated to crude product weighing 5.3 g. The desired product, M.P. 118–121° C.; 3.0 g., free of mono-chloro triazine, is obtained by fractional crystallization of this crude product from heptane. The analytically pure sample is obtained by successive recrystallizations from heptane, M.P. 122–126° C.

EXAMPLE 3

Preparation of 2-(2,4,4-trimethyl-2-pentylamino)-4,6-di(2,5-dimethyl-1-pyrrolidino)-s-triazine Using ice-bath conditions a solution of 5.54 g. (0.03 mole) of cyanuric chloride in 50 ml. of xylene is added dropwise to 100 ml. of xylene containing 5.04 ml. (0.03 mole) of 2,4,4-trimethyl-2-pentylamine and 5.16 ml. (0.03 mole) of diisopropylethylamine. After addition is completed the reaction is allowed to reach room temperature and allowed to stand for 16 hours. At the end of this period a solution of 12.9 g. (0.13 mole) of 2,5-dimethylpyrrolidine in 100 ml. of xylene is added dropwise and the reaction solution is refluxed for 24 hours. The cooled xylene is extracted with water which is then backwashed with ethyl acetate. The combined organic layers are dried and evaporated to a hard glass-like substance, the desired product, which can be purified by being forced out of ethyl acetate-heptane at Dry-Ice temperature. The glass-like substance so obtained is powdered and dried for 48 hours in the vacuum-oven, weight, 4.2 g., M.P. 53–60° C.

EXAMPLE 4

Preparation of 2-(2,7-dimethyl-1-hexamethyleneimino)-4,6-bis-(2,4,4-trimethyl-2-pentylamino)-s-triazine This compound was prepared similarly to the compound described in Example 1, using 2,7-dimethylhexamethyleneimine instead of 2,5-dimethylpyrrolidine.

EXAMPLE 5

Preparation of 2-(tert-butylamino)-4,6-bis(2,6-dimethyl-1-piperidino)-s-triazine This compound was prepared using the first step of the procedure described in Example 3, substituting t-butylamine for t-octylamine. The xylene was extracted with water, dried and evaporated to crude 2,4-dichloro-6-(tert-butylamino)-s-triazine. This material was added to a Parr bomb containing 20.3 g. (0.18 mole) of 2,6-dimethylpiperidine and the bomb heated at 180° C. for 48 hours. The reaction contents were dissolved in ethyl acetate which was washed with water, dried and evaporated to give the product.

EXAMPLE 6

Preparation of 2-(2,6-dimethyl-1-piperidino)-4-(2,3-dimethyl-3-pentylamino) - 6 - (2,3-dimethyl-2-hexylamino)-s-triazine Using ice-bath conditions a solution of 5.54 g. (0.03 mole) of cyanuric chloride is added dropwise to 100 ml. of xylene containing 3.45 g. (0.03 mole) of 2,3-dimethyl-3-pentylamine and 5.16 ml. (0.03 mole) of diisopropylethylamine. After 16 hours at 25° C., 3.0 g. (0.03 mole) of 2,3-dimethyl-2-hexylamine and 5.16 ml. (0.03 mole) of diisopropylethylamine is added and the solution is refluxed overnight. The crude monochloro product is isolated by evaporation of the water-washed, dried xylene solution and is transferred to a Parr bomb containing 10.2 g. (0.09 mole) of 2,6-dimethylpiperidine. This mixture was heated at 180° C. for 48 hours and worked up to give the desired product by evaporation of a water-washed, dried ethyl acetate extract of the bomb contents.

EXAMPLE 7

Preparation of 2-(2,4,4-trimethyl-2-pentylamino)-4,6-bis(2,6-dimethyl-1-piperidino)-s-triazine This compound was prepared similarly to the compound of Example 3. After addition of the t-octylamine and the 16 hours reaction period, a crude 2,4-dichloro-6-(2,4,4-trimethyl-2-pentylamino)-s-triazine was isolated by extraction of the xylene with water, drying and evaporation of the xylene. This crude product was added to a Parr bomb containing 20.3 g. (0.18 mole) of 2,6-dimethylpiperidine and the mixture was heated at 180° C. for 48 hours. The reaction contents were dissolved in ethyl acetate which was washed with water, dried and evaporated to yield the desired product.

EXAMPLE 8

Preparation of 2-(2,2,6,6-tetramethyl-1-piperidino)-4,6-bis(2,4,4-trimethyl-2-pentylamino)-s-triazine A mixture of 4.34 g. (0.0015 mole) of 2,4-dichloro-6-(2,2,6,6-tetramethyl-1-piperidino)-s-triazine and 15.1 ml. (0.09 mole) of t-octylamine was heated in a Parr bomb at 180° C. for 22 hours. The bomb contents were dissolved in ethyl acetate, which was washed with water, dried and evaporated to give 3.65 g. of crude product, M.P. 105–110° C. Several recrystallizations from ethanol gave 2.1 g. of analytically pure material, M.P. 110–112° C.

EXAMPLE 9

Preparation of 2,4-dichloro-6-(2,2,6,6-tetramethyl-1-piperidino)-s-triazine

A solution of 5.54 g. (0.03 mole) of cyanuric chloride in 50 ml. of xylene was dropped into a solution of 8.62 g. (0.061 mole) of 2,2,6,6-tetramethylpiperidine at 0–5° C. The reaction was held at 25° C. for 16 hours, then heated at reflux for 16 hours. The xylene was washed with water, dried and evaporated to 5.8 g. of crude product. Recrystallization from ethyl acetate heptane gave pure material, M.P. 119–121° C.

EXAMPLE 10

Preparation of 2-(2-methyl-1-piperidino)-4,6-bis(2,4,4-trimethyl-2-pentylamino)-s-triazine This compound was prepared as described for Example 1, substituting 2-methyl-1-piperidine for 2,5-dimethyl-1-pyrrolidine.

What is claimed is:

1. A compound selected from the group consisting of those of the formulae:

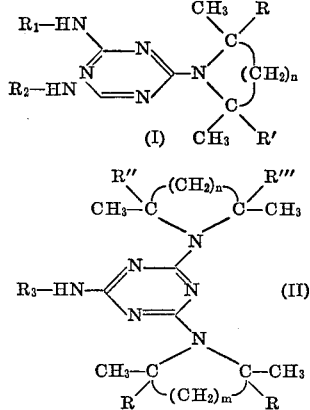

wherein R, R′, R″ and R‴ are each selected from the group consisting of hydrogen and methyl, $R_1$, $R_2$ and $R_3$ are each tertiary alkyl of from 4 to 11 carbon atoms, and $n$ and $m$ are each an integer from 2 to 4; and the non-toxic pharmaceutically acceptable acid-addition salts thereof.

2. A compound according to Formula I of claim 1 wherein $R_1$ and $R_2$ are 2,4,4-trimethyl-2-pentyl, R and R′ are hydrogen and $n$ is 2.

3. A compound according to Formula I of claim 1 wherein $R_1$ and $R_2$ are 2,4,4-trimethyl-2-pentyl; R and R′ are hydrogen; and $n$ is 3.

4. A compound according to Formula II of claim 1 wherein $R_3$ is 2,4,4-trimethyl-2-pentyl; R, R′, R″ and R‴ are hydrogen; and $n$ and $m$ are 2.

5. A compound according to Formula I of claim 1 wherein $R_1$ is tert-amyl; $R_2$ is 3-ethyl-3-pentyl; R and R′ are hydrogen; and $n$ is 2.

6. A compound according to Formula I of claim 1 wherein $R_1$ is tert-butyl; $R_2$ is 2,3-dimethyl-2-butyl; R and R′ are hydrogen; and $n$ is 4.

7. A compound according to Formula II of claim 1 wherein $R_3$ is 3-ethyl-3-hexyl; R, R', R'' and R''' are hydrogen; and $n$ and $m$ are 4.

8. A compound according to Formula I of claim 1 wherein $R_1$ and $R_2$ are 2,4,4-trimethyl-2-pentyl; R and R' are methyl; and $n$ is 3.

9. A compound according to Formula II of claim 1 wherein $R_3$ is 2,3-dimethyl-2-hexyl; R and R'' are hydrogen; R' and R''' are methyl; $n$ is 2; and $m$ is 3.

References Cited
UNITED STATES PATENTS 3,277,065 10/1966 Petropoulos et al. _ 260—249.6X
3,410,855 11/1968 Varsanyi et al. _____ 260—249.6

JOHN M. FORD, Primary Examiner

U.S. Cl. X.R.

260—249.5, 249.8; 424—249